United States Patent [19]

Nozaki et al.

[11] Patent Number: 4,883,709
[45] Date of Patent: Nov. 28, 1989

[54] COMPOSITE NON-WOVEN FABRIC AND PROCESS FOR PREPARING SUCH NON-WOVEN FABRIC

[75] Inventors: Satoshi Nozaki, Ehime; Shigeo Imai, Kawanoe; Makoto Ishigami, Tokyo; Katsushi Tomida, Kanonji, all of Japan

[73] Assignee: Uni-Charm Corporation, Ehime, Japan

[21] Appl. No.: 261,426

[22] Filed: Oct. 24, 1988

[30] Foreign Application Priority Data

Jun. 21, 1988 [JP] Japan .................................. 63-152985

[51] Int. Cl.$^4$ .............................................. D04H 1/58
[52] U.S. Cl. ..................................... 428/288; 28/104; 28/105; 428/297; 428/299; 428/326
[58] Field of Search ................... 28/104, 105; 428/288, 428/297, 326, 299

[56] References Cited

U.S. PATENT DOCUMENTS 4,442,161  4/1984  Kirayoglu et al. ................... 428/219
4,705,712  11/1987 Cashaw et al. ....................... 428/152

Primary Examiner—James J. Bell
Attorney, Agent, or Firm—Fred Philpitt

[57] ABSTRACT

Here are disclosed a composite non-woven fabric having a high dimensional stability and a process for preparing such non-woven fabaric. This non-woven fabric is prepared by a cross-stretching starting non-woven fabric obtained by a fiber entanglement treatment of a staple fiber web by fluid jets to form a substrate, then introducing short fibers onto this cross-stretched substrate and filling said cross-stretched substrate with said short fibers by further fiber entanglement treatment also by fluid jets. Such composite non-woven fabric is suitable particularly as cloth for disposable medican garments or the like.

18 Claims, 1 Drawing Sheet

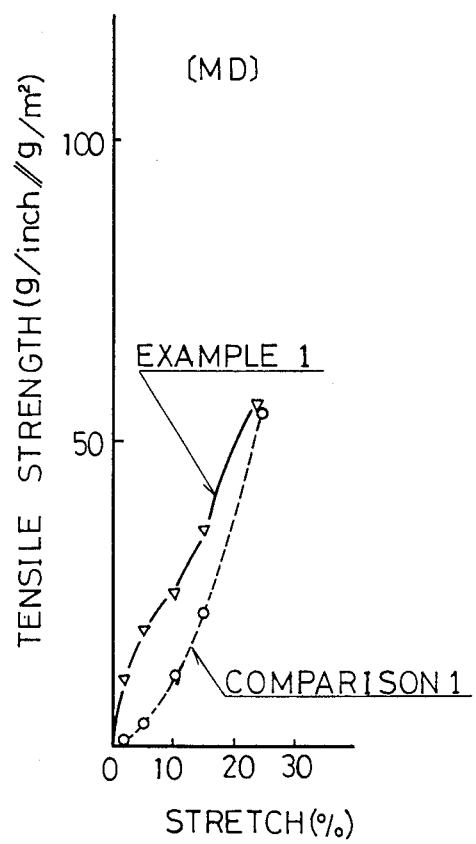
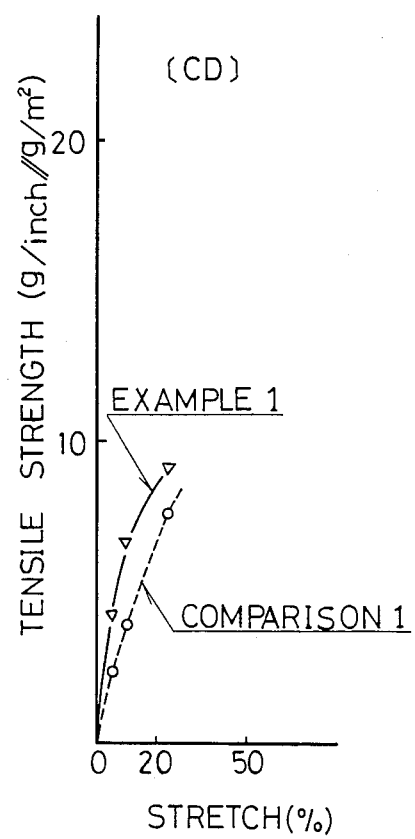

COMPOSITE NON-WOVEN FABRIC AND PROCESS FOR PREPARING SUCH NON-WOVEN FABRIC

BACKGROUND OF THE INVENTION

The present invention relates to a composite nonwoven fabric having high dimensional stability and a process for preparing such nonwoven fabric.

Conventional fiber-entangled nonwoven fabrics prepared by a water jet treatment of a web composed of staple fibers, i.e., spunlaced fabrics, has been disadvantageous in that there is a significant difference between warp and weft tensile strengths and this drawback limits its application. To overcome this problem, there has already been a method proposed for improvement of such differential tensile strength, according to which, after a cross-stretching treatment, the resultant cross-stretched web is fixed by subjecting said web again to the water jets, or by use of a suitable binder or by a heat treatment causing fibers to be welded together, as disclosed, for example, in the Japanese Pat. Application Disclosure Gazette No. 49-42970.

However, use of a binder and fixation through fiber welding have been found to deteriorate the drape property and feeling of the fiber-entangled nonwoven fabrics obtained through the water jet treatment.

Fixation of nonwoven fabric through the fiber entanglement treatment by subjecting the web to the water jet treatment again after the cross-stretching, on the other hand, would certainly improve the cross direction/machine direction strength ratio of the nonwoven fabric through the fiber entanglement treatment only by the primary water jets, but the ratio of the initial tensile strengths in both directions contributing to the desired dimensional stability of the nonwoven fabric could not be adequately improved by this method. Such problem appears, for example, as a phenomenon that a machine direction tension easily causes a cross direction dimensional change(shrink) and a cross direction tension easily causes a machine direction dimensional change(shrink).

A principal object of the present invention is to provide, in view of the above-mentioned drawback of the prior art, a composite nonwoven fabric which is excellent in its drape property and dimentional stability.

SUMMARY OF THE INVENTION

Said object is, in accordance with the present invention, achieved by a composite nonwoven fabric comprising a nonwoven fabric substrate composed of first staple fibers and second short fibers entangled on and in said nonwoven fabric substrate under the action of a fluid, characterized in that said substrate comprising a fiber-entangled nonwoven fabric is stretched in the cross direction by approximately 20 to 200% and that traces of fluid jets are formed on a layer of said fabric comprising predominately the second short fibers, which are more closely spaced from one another than traces of the fluid jets formed on a layer of said fabric comprising predominately the first staple fibers.

The present invention encompasses also a process for preparing said composite nonwoven fabrics comprising: a first step of subjecting a fibrous web comprising first staple fibers to a water jet treatment on a support to form a fiber-entangled nonwoven fabric substrate; a second step of cross-stretching said substrate by approximately 20 to 200%; a third step of introducing second short fibers in the form of a sheet or slurry onto said substrate which has been cross-stretched; a fourth step of subjecting a lamellar material thus comprising said cross-stretched substrate and said second short fibers placed on said substrate to a water jet treatment at a velocity of 40 m/sec or higher and under a pressure of at least 10 kg/cm$^2$ onto said second short fibers from above, the water jets being more closely spaced from one another than traces of the water jets which have been formed on said stretched substrate at said second step, on a support comprising a netlike support or a perforated plate having an opening ratio of 2.5 to 50%, so as to entangle said second short fibers among the fibers of said cross-stretched substrate and thereby to fill interstices of said substrate fibers.

The composite nonwoven fabric constructed according to the present invention has a high dimensional stability since its initial tensile strength is high enough to resist any significant stretch and is excellent also in its drape property as well as in its feeling. Therefore, the composite nonwoven fabric of the invention is commonly useful as cloth for disposable sheets and garments, particularly for those which are usually used for the medical field of application such as gown, drape, hood and bed sheets used in the surgical operating room.

BRIEF DESCRIPTION OF DRAWING

FIGS. 1 and 2 are graphic diagrams showing correlation of tensile strength and stretch in MD and CD directions of nonwoven fabric respectively in EXAMPLE 1 and COMPARISON 1.

PREFERRED EMBODIMENT OF INVENTION

The invention will be described more in detail by way of example in reference with the accompanying drawing.

The composite nonwoven fabric of the present invention is prepared through a process comprising steps of a cross-stretching starting nonwoven fabric comnposed of first staple fibers which have been subjected to a primary entanglement treatment by water jets, then placing second short fibers on the cross-stretched nonwoven fabric and subjecting this lamellar material to a secondary fiber entanglement treatment by water jets.

A fibrous web such as a card web composed of the first staple fibers is subjected to the fiber entanglement treatment by water jets in a well known manner, for example, as disclosed by U.S. Pat. No. 3,508,308 to provide the desired starting nonwoven fabric. This starting nonwoven fabric is cross-stretched by approximately 20 to 200% with respect to its initial width to form a composite nonwoven fabric substrate having its machine direction/cross direction strength ratio improved. Cross-stretching ratio is preferably approximately 20 to 100%. To improve the absolute strength of the substrate, the first staple fiber preferably has a fiber length of 20 to 130 mm and a fineness of 0.7 to 6 d, which is preferably selected from the group consisting of polyester fiber, acryl fiber, nylon fiber and polyolefine fiber. Particularly it is preferable to use polyester fibers alone. For the cross-stretching treatment, the cross-stretching means of the prior art such as a tenter frame may be used. This cross-stretching treatment enhances the internal bond of the substrate so as to improve the initial tensile strength. As a consequence, any significant stretch deterioration the dimensional stability is suppressed once the substrate has been cross-stretched by a predetermined ratio.

The second short fibers introduced onto the nonwoven fabric substrate preferably comprise fibers having a fiber length of approximately 25 mm or less, and most preferably of 2 to 5 mm, in view of a fact that these second short fibers are primarily destined to be combined with said substrate and thereby to adequately reinforce holes and loose portions appearing in said substrate as a result of cross-stretching. Additionally, the second short fibers are preferably introduced onto the substrate with less uniform orientation of the fibers, for example, in the form of a sheet or slurry. Selection of the second short fibers is not critical. In practice, any one or any combination of polyester, polyacryl, polyolefine, nylon, cellulosic(inclusive of rayon) fibers may be used depending on the particular application. It should be noted here that fibers having special cross-sections such as a flat cross-section are preferable since such special cross-sections suppress slippage of the second short fibers with respect to the substrate and facilitate the entanglement thereof. Specifically, woody pulp fibers or other cellulosic pulp fibers in the form of a sheet or slurry are introduced onto the substrate as a monolayer or multilayers. After introduction of the second short fibers onto the substrate, this lamellar material is subjected again to the fiber entanglement treatment by water jets so as to combine the two components. Preferable sheet-like pulp fibers include tissue paper and so-called pulp sheet usually used for paper making, which are of a desired basic weight and can be easily loosened by the water jets.

Particularly when the composite nonwoven fabric of the present invention is prepared as material for the surgical operating room garments such as gowns, drapes, hoods and bed sheets, it is preferable to introduce the pulp fibers and the synthetic fibers onto the substrate in previously mixed condition or so that these two types of fibers may be mixed together on said substrate in order to achieve good feeling and softness rather than to introduce said pulp fibers alone as the second short fibers onto said substrate. The most preferable composition of such nonwoven fabric consists of the substrate having a basic weight at least of 20 g/m² and a second short fibers comprising 30 to 90% by weight of synthetic fibers such as polyester fibers having a fiber length of 3 to 5 mm and a fineness of 0.1 to 3 d and 10 to 70% by weight of the pulp fibers so that the nonwoven fabric as whole has a basic weight of 25 to 100 g/m². Such nonwoven fabric is preferable for the above-mentioned applications such as the operating room gown, also such nonwoven fabric has high water resistance, fluid barrier property and breathability.

To improve the initial tensile strengths both in the machine direction(MD) and the cross direction(CD) and to provide the nonwoven fabric being prepared with a high dimensional stability, a weight ratio of the second short fibers with respect to the first staple fibers is preferably at least ¼. For example, it is preferable to combine the cross-stretched nonwoven fabric having a basic weight of 40 g/m² with the sheet-like pulp fibers having a basic weight of at least 10 g/m².

For the fiber entanglement treatment by use of the secondary water jets, the fiber entanglement method of the prior art, for example, as disclosed by U.S. Pat. No. 3,485,706 may be used.

As a result of the primary water jet treatment for the fiber eatanglement effect, a plurality of continuous lines (jet traces) along which the fibers entangle together with relatively high entanglement degree are formed in the nonwoven fabric, said lines or traces are spaced from one another at a distance corresponding to that between the orifice arrays adapted to jet high pressure fluid. The spacing between said jet traces is enlarged as a result of the subsequent cross-stretching treatment to form the starting nonwoven fabric and the previously mentioned holes and loose portions appear predominately in the region defined between each pair of adjacent jet traces. Therefore, to combine the second short fibers with the starting nonwoven fabric and thereby to fill said region with said second short fibers, the secondary water jets for the fiber entanglement treatment are preferably supplied at a high pressure from the orifice arrays spaced from one another at a shorter distance than that between each pair of adjacent jet traces formed on the cross-stretched nonwoven fabric as the starting nonwoven fabric.

Specifically, the fiber entanglement treatment by use of the secondary water jets is carried out as follows: sheet-like or slurry-like second short fibers are introduced onto the cross-stretched nonwoven fabric substrate, then water jets are supplied from above said second short fibers at a velocity of 40 m/sec or higher and under a pressure of at least 10 kg/cm² on a support comprising a netlike support of less than 60 meshes or a perforated plate having an opening ratio of 2.5 to 50%. This lamellar fibrous web is drained off by suction means arranged under said support or plate if desired. The suction drainage is very effective to avoid an undesirable phenomenon that the second short fibers float in stagnant water on the substrate and the filling efficiency is thereby deteriorated. In regard to the nozzle means arranged transversely of the lamellar material consisting of the substrate and the second short fibers, it is preferable to use orifices each being of 0.05 to 0.25 mm diameter and arranged at a pitch less than 1 mm, preferably at a pitch of 0.25 to 0.7 mm. Such diameter and pitch are preferable in consideration of an effect with which the substrate is filled with the second short fibers.

The composite nonwoven fabric thus prepared in accordance with the present invention gets now predominately its region defined between each pair of adjacent jet filled and entangled with the second short fibers so that said holes and loose portions are effectively reinforced. As a consequence, the traces of jets are formed on a layer predominately comprising the second short fibers at spacings narrower than the spacings at which the traces of jets are formed on a layer predominately comprising the first staple fibers of this composite nonwoven fabric. The composite nonwoven fabric constructed in accordance with the present invention exhibits a steeply rising S-curve in the drawing showing a correlation between the stretch and the tensile strength. This steep S-curve appears not only in the MD direction but also in the CD direction. As will be apparent from the drawing, the composite nonwoven fabric has the property required for the dimensional stability, i.e., the initial tensile strength is sufficiently high to suppress any significant stretch. It should be understood that this composite nonwoven fabric may be treated with well known repellent and subjected to well known softening treatment if desired.

Advantages of the present invention will be further apparent from Examples as described in connection with corresponding Comparisons.

COMPARISON 1

A card web comprising 100% of 1.4d X 44 mm polyester fibers was subjected to the primary entanglement treatment by columnar water jets at a pressure of 50 kg/cm² to obtain a starting nonwoven fabric weighing 40 g/m² After crossstretching by approximately 30%, this nonwoven fabric was subjected to the secondary fiber entanglement treatment by fluid at a pressure of 50 kg/cm². The primary fiber entanglement treatment used orifices each having a diameter of 0.13 mm and arranged at a pitch of 1 mm, and the secondary fiber entanglement treatment used orifices each having a diameter of 0.92 mm and arranged at a pitch of 0.5 mm.

EXAMPLE 1

Two paper-like pulp fiber sheets each weighing 21 g/m² one placed on the other were placed on the starting nonwoven fabric weighing 40 g/m² obtained in the same manner as in comparative Example 1 and then cross-stretched by approximately 30%, and then columnar water jets at a pressure of 50 kg/cm² as in Comparison 1 were supplied from above said pulp fiber sheets for the secondary fiber entanglement treatment. The orifice diameter and the orifice pitch for the primary and secondary fiber entanglement treatment were respectively the same as in Comparison 1.

Stretch/tensile strength correlations both in the MD and CD directions were determined for the nonwoven fabric obtained in Comparison 1 and Example 1, respectively, and plotted in FIGS. 1 and 2 respectively by solid and broken lines.

In Example 1 and Comparison 1, the number of steps for the secondary fiber entanglement treatment, i.e., amount of fluid energy being supplied was increased and properties of the nonwoven fabric thus obtained were determined. Determination indicated no difference in the correlation of stretch/tensile strength.

EXAMPLE 2

A card web comprising 100% of 1.4d X 44 mm polyester fibers was subjected to a primary fiber entanglement treatment by columnar water jets at a pressure of 50 kg/cm² to obtain nonwoven fabric weighing 52 g/m². After cross-stretching by approximately 30%, a paper-like pulp fiber sheet weighing 20 g/m² was introduced onto this nonwoven fabric and subjected to a secondary fiber entanglement treatment by columnar water jets at a pressure of 50 kg/cm² to obtain a composite a nonwoven fabric weighing approximately 60 g/m². The orifice diameter and orifice pitch used respectively in the primary and secondary fiber entanglement treatment were the same as in Example 1.

COMPARISON 2

A card web comprising 100% of 1.4d X 44 mm polyester fibers was subjected to a fiber entanglement treatment by columnar water jets at a pressure of 50 kg/cm² to obtain a nonwoven fabric weighing 80 g/m². After cross-stretching by approximately 30%, this nonwoven fabric was subjected again to a fiber entanglement treatment by columnar water jets at a pressure of 50 kg/cm² to obtain a nonwoven fabric weighing approximately 60 g/m².

Stretch/tensile strength correlations both in MD and CD directions were determined for the nonwoven fabric obtained in Example 2 and Comparison 2, respectively, and plotted in Table 1.

Table 2 indicates CD/MD dimensional changes(reduction ratio) occurring due to MD/CD tension as a weight ratio of the first and second fibers changes. For determination of the dimensional changes, each nonwoven fabric sample of a standard dimension (200 X 50 mm) was MD-stretched under a load of 2kg and CD-stretched under a load of 250 g, and the dimension reduction ratios both in the CD and MD directions were determined.

TABLE 1

|  | MD STRENGTH (g/inch) | | | | | CD STRENGTH (g/inch) | | | | |
| --- | --- | --- | --- | --- | --- | --- | --- | --- | --- | --- |
| STRETCH (%) | 2 | 5 | 10 | 15 | *MAX | 5 | 10 | 25 | 50 | *MAX |
| EXAMPLE 2 | 259 | 909 | 2351 | 4314 | 11615 | 191 | 377 | 774 | 2061 | 3305 |
| COMPARISON 2 | 113 | 194 | 345 | 533 | 8830 | 71 | 126 | 284 | 1040 | 3473 |

*MAX represents a strength at a moment of breakage.

TABLE 2

| RATIO BY WEIGHT | | DIMENSIONAL REDUCTION (%) | |
| --- | --- | --- | --- |
| 1st fibers | 2nd fibers | I | II |
| 100 | 133 | 0 | 0 |
| 100 | 31 | 6 | 0 |
| 100 | 27 | 6 | 0 |
| 100 | 25 | 18 | 2 |
| 100 | 10 | 54 | 39 |
| 100 | 0 | 58 | 48 |

I: Cross-direction dimensional reduction under machine-direction tension.
II: Machine-direction dimensional reduction under cross-direction tension.

What is claimed is:

1. A composite nonwoven fabric comprising a nonwoven fabric substrate composed of first staple fibers and second short fibers entangled on and in said nonwoven fabric substrate under action of fluid, characterized by that said substrate comprising a fiber-entangled nonwoven fabric stretched in cross direction by 20 to 200% and that traces of fluid jets are formed on a layer of said fabric comprising predominately the second short fibers, which are more closely spaced from one another than traces of the fluid jets formed on a layer of said fabric comprising predominately the first staple fibers.

2. The composite nonwoven fabric according to claim 1, wherein a ratio by weight of said second short fibers with respect to the first staple fibers is at least ¼.

3. The composite nonwoven fabric according to claim 1, wherein said first staple fiber has a fiber length of 20 to 130 mm and a fineness of 0.7 to 6d.

4. The composite nonwoven fabric according to claim 1, wherein said second short fiber has a fiber length less than 25 mm and a fineness less than 3d.

5. The composite nonwoven fabric according to claim 1, wherein said first staple fibers are polyester fibers.

6. The composite nonwoven fabric according to claim 1, wherein said second short fibers comprise any one or a combination of pulp fibers and synthetic fibers.

7. An operating room gown or drape prepared from the composite nonwoven fabric according to claim 1, wherein said second short fibers comprise at least pulp fibers.

8. The operating room gown or drape prepared from the composite nonwoven fabric according to claim 7, wherein said second short fibers comprise a mixture of 10 to 70% by weight of pulp fibers and 30 to 90% by weight of synthetic fibers having a fineness of 0.1 to 3d.

9. The operating room gown or drape prepared from the composite nonwoven fabric according to claim 7, wherein the nonwoven fabric substrate comprising said first staple fibers has a basic weight of 20 g/m² and a lamellar material including said second short fibers has a basic weight of 25 to 100 g/m².

10. A process for preparing composite nonwoven fabrics comprising:
(a) in a first step subjecting a fibrous web comprising first staple fibers to a water jet treatment on a support to thereby form a fiber-entangled nonwoven fabric substrate;
(b) in a second step cross-stretching said substrate by 20 to 200%;
(c) in a third step introducing second short fibers in the form of a sheet or slurry onto said cross-stretched substrate;
(d) in a fourth step subjecting the product resulting from step (c) to the action of a plurality of water jets at a velocity of at least 40 m/sec and under a pressure of at least 10 kg/cm², said water jets being more closely spaced from one another than the traces of the jets which have been formed on said stretched substrate as a result of step (b) on a support comprising a netlike support or perforated plate having a opening ratio of 2.5 to 50% so as to entangle said second short fibers among the fibers of said cross-stretched substrate and thereby to fill the interstices of said substrate fibers.

11. The process according to claim 10 wherein the orifices of the jets used in step (d) are arranged at a closer pitch than the pitch of jet traces formed on said cross-stretched substrate, and each of said orifices has a diameter of 0.05 to 0.25 mm.

12. A process according to claim 10 wherein the orifices of the jets used in step (d) are arranged at a pitch less than 1 mm.

13. A composite nonwoven fabric produced according to the process of claim 10.

14. The process according to claim 10 wherein the ratio by weight of said second short fibers with respect to the first staple fibers in at least ¼.

15. The process according to claim 10 wherein said first staple fiber has a fiber length of 20 to 130 mm and a fineness of 0.7 to 6d.

16. The process according to claim 10 wherein said second short fiber has a fiber length less than 25 mm and a fineness less than 3d.

17. The process according to claim 10 wherein said first staple fibers and polyester fibers.

18. The process according to claim 10 wherein said second short fibers are selected from the group consisting of pulp fibers and synthetic fibers.

* * * * *